April 12, 1927.
N. W. TRAUTNER
1,624,852
GREASE RETAINER
Filed May 11, 1925
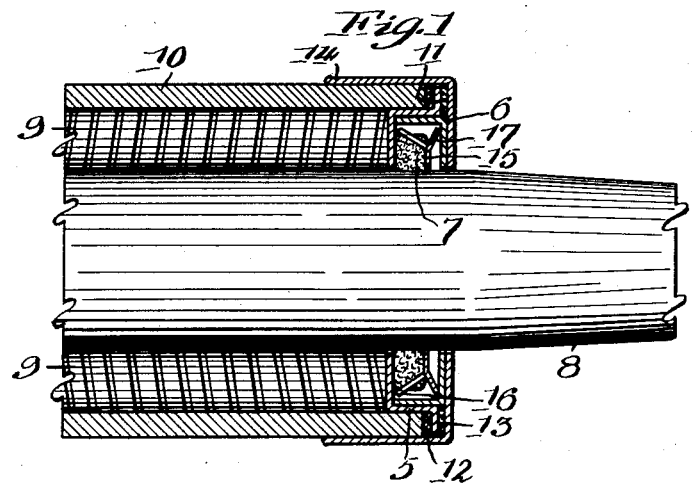
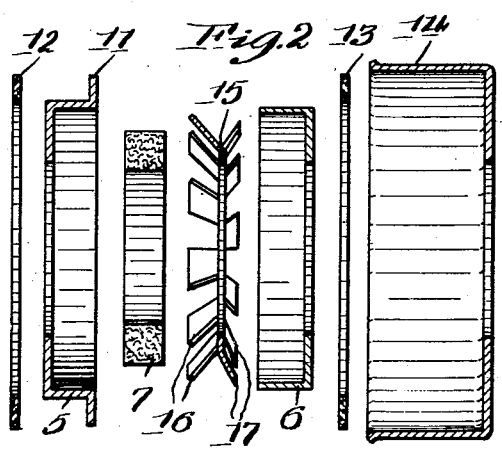
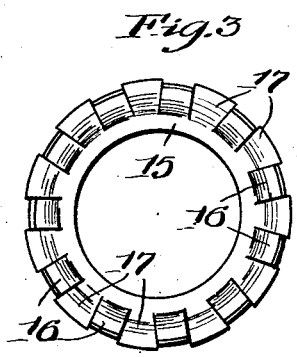
Inventor
Nicholas W. Trautner
By Stryker & Stryker
Attorneys Patented Apr. 12, 1927.

1,624,852

UNITED STATES PATENT OFFICE.

NICHOLAS W. TRAUTNER, OF ST. PAUL, MINNESOTA.

GREASE RETAINER.

Application filed May 11, 1925. Serial No. 29,575.

This invention relates to grease retainers, particularly, although not exclusively, adapted to be applied to the rear axle housings of motor cars to prevent the escape of lubricant therefrom.

It is my object to provide a novel, inexpensive and efficient grease retainer of this kind. Referring to the accompanying drawings, which illustrate the best form of my device at present known to me, Figure 1 is a central, vertical section through my improved grease retainer mounted on an axle housing; Fig. 2 is a similar section through my invention detached from the housing and arranged with its several parts spaced horizontally in the order in which they are assembled and Fig. 3 is a plan view of the device for simultaneously pressing the packing material upon the shaft and against an abutment.

In the drawings I have used the numerals 5 and 6 to indicate the two parts of a receptacle for packing indicated by the numeral 7. This packing is preferably made of felt in the form of a ring adapted to encircle the drive shaft 8 of a motor car. The shaft 8 has the common type of roller bearings 9 and is enclosed in a housing 10. The part 5 of the packing receptacle is formed to fit within the outer end of the housing 10 and has a peripheral flange 11 arranged to abut against the end of said housing. Washers 12 and 13 of suitable compressible material, such as cork, are placed at opposite sides of the flange 11 to prevent leakage. To hold the packing receptacle within the outer end of the housing 10, the usual cap 14 is provided. This cap is adapted to be forcibly pressed on the end of the housing 10 about the shaft 8.

Fitting loosely within the part 6 of the packing receptacle is a spring member 15 having a series of peripheral fingers 16 arranged to embrace the packing 7, and a second series of fingers 17 arranged to slidably engage the inner end surface of the part 6. The series of fingers 16 and 17 extend obliquely at opposite sides from the central portion of the member 15, but the angle made by the fingers 16 with the plane of the member 15 is greater than the angle between the fingers 17 and said plane.

My peculiar form of the member 15 with its series of fingers 16 and 17 constitutes an important feature of this invention. The disc member 15 is preferably cut from a sheet of spring metal, such as brass or a copper alloy, by dieing-out a central aperture for the shaft 8 and slitting the periphery of the disc substantially radially. The alternate fingers thus formed are merely bent so as to project from opposite sides of the disc.

In operation, the several parts are held together, as shown in Figure 1, by frictional engagement of the cap 14 with the housing 10, and the fingers 17 are maintained under spring tension so as to press the packing ring 7 firmly against the inner end surface of the part 5. By reason of the oblique arrangement of the fingers 16, said fingers under the action of the fingers 17, also urge the felt radially inward upon the shaft 8. Simultaneously with the above described operation of the fingers 16 and 17 portions of the ring 7 are forced between the fingers 16 and interlock therewith to prevent rotation of said ring. Sufficient space is allowed between the outer end of the fingers 16 and 17 and inner periphery of the part 6 to permit limited movement of the packing 7 and member 15 in engagement with the shaft 8. This arrangement is advantageous in that even when the shaft becomes worn in its bearings so that lateral movement thereof is permitted, the packing is held in firm contact with the shaft and with the surface of the part 5. Thus, the fingers 17 are allowed to slide upon the inner surface of the part 6. By reason of the resilient nature of the fingers 17, said fingers maintain the packing 7 at all times in firm contact with the shaft and packing receptacle. As all parts of the present invention can be manufactured in simple and rapidly operating machines, the expense of the device has been reduced to a minimum.

Having described my invention what I claim as new and desire to protect by Letters Patent is:

1. A retainer for lubricant comprising, an annular receptacle adapted to encircle a shaft and formed from inner and outer cup-shaped members telescoping one within the other, a packing ring formed to fit about said shaft in said receptacle, resilient means arranged within said receptacle to press said ring upon the periphery of said shaft and against the inner surface of one of said cup-shaped members, and means adapted to engage one of said cup-shaped members to hold said resilient means in compressed engagement with said packing ring.

2. The combination with a housing and a shaft projecting from an end of said housing, of an annular receptacle adapted to encircle said shaft and extending into an end of said housing, said receptacle being formed with inner and outer members telescoping one within the other, a flange disposed on the periphery of said outer member and arranged to be secured against the end of said housing, a packing ring fitting about said shaft in said receptacle, resilient means disposed within said receptacle to press said ring upon the periphery of said shaft and against the inner, end surface of said outer telescoping member, and a cap for the end of said housing arranged to engage said inner telescoping member and hold the same in the other telescoping member.

In testimony whereof, I have hereunto signed my name to this specification.

NICHOLAS W. TRAUTNER.